June 18, 1957 R. P. SNODGRASS 2,796,604
SAFETY DEVICE FOR INSTRUMENT APPROACH SYSTEMS
Filed Dec. 6, 1954
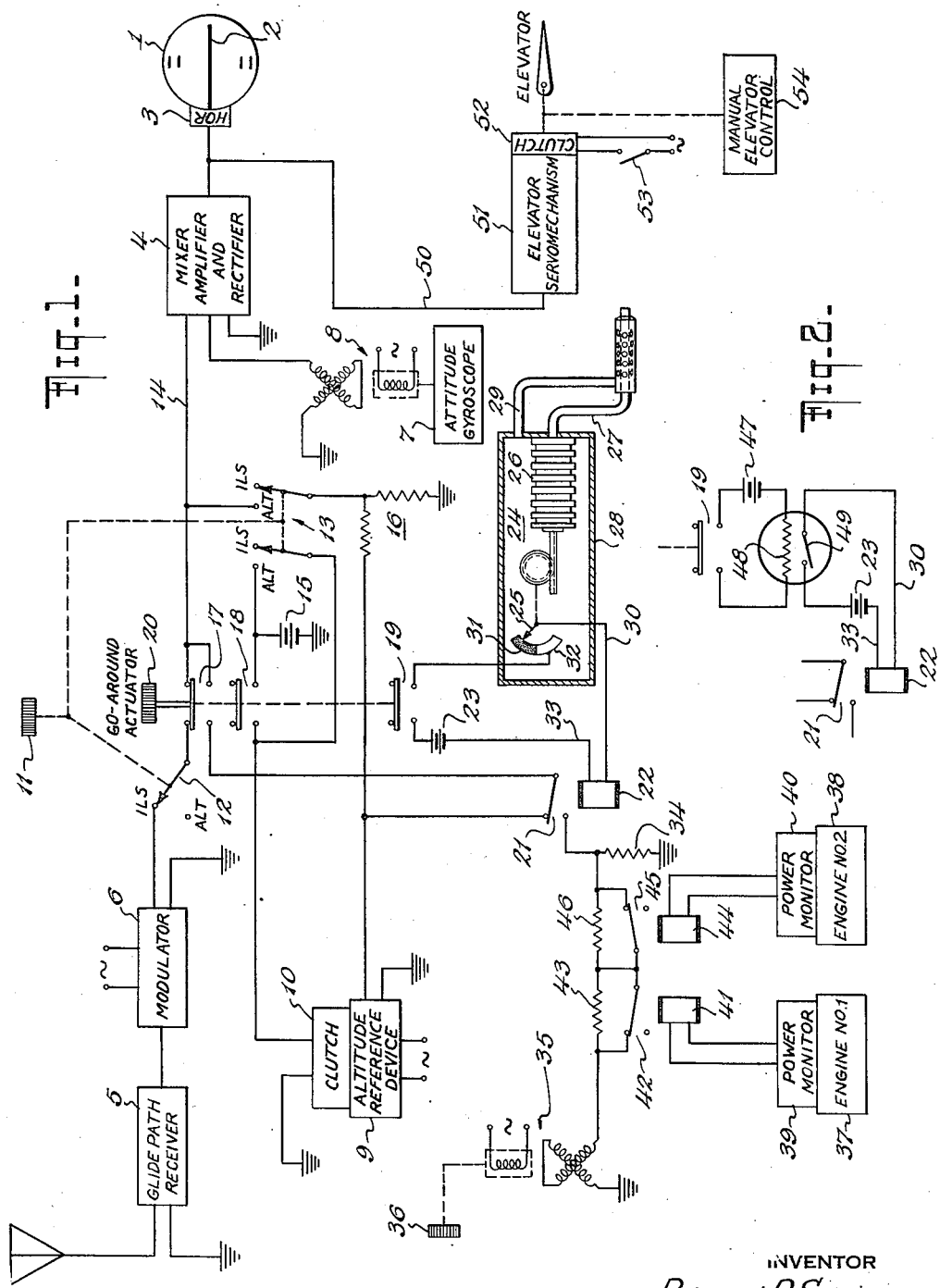
INVENTOR
REUBEN P. SNODGRASS
BY
R. V. Craddock
ATTORNEY United States Patent Office 2,796,604
Patented June 18, 1957

2,796,604
SAFETY DEVICE FOR INSTRUMENT APPROACH SYSTEMS

Reuben P. Snodgrass, Lake Ronkonkoma, N. Y., assignor to Sperry Rand Corporation, a corporation of Delaware Application December 6, 1954, Serial No. 473,109
7 Claims. (Cl. 343—108)

My invention relates to radio guidance approach systems or blind landing systems for aircraft. More particularly, the invention concerns improvements in an arrangement of the type described in U. S. Patent 2,654,086 for "Safety Device for Instrument Approach Systems," issued September 29, 1953, to C. C. Pine et al.

According to the foregoing patented arrangement, provision is made whereby the pilot of an aircraft, who relies for control guidance on a zero-reading indicator ordinarily responsive on a radio-defined glide path to the algebraic sum of glide path displacement and pitch signals, may continue to rely on the indicator in controlling his craft to execute a go-around or missed-approach maneuver once he has abandoned his intention of landing. The arrangement for initiating the go-around includes a manually operable switching device for severing the indicator input from the glide path displacement signal and for simultaneously biasing the pitch signal input so that the indicator calls for a fly-up or climb attitude. And in this prior arrangement, it is assumed that the engine power of the aircraft, hence its air speed, is independently sufficiently increased by throttle manipulation when the go-around is initiated so that the fly-up or climb attitude called for will not cause the craft to stall.

There are a number of aircraft, however, notably of the jet-propelled type, wherein the increased power response of the engine to fuller throttle is characteristically delayed long enough to preclude, for reasons of safety, the immediate placing of the craft in a fly-up attitude. Also, in many aircraft the speed of the approach is significantly lower than the best speed for climb, so that a period of acceleration to the best climb speed characteristically must take place prior to initiating the climb. In these aircraft, therefore, I have found it necessary in order greatly to diminish the possibility of stalling or to permit acceleration to a higher air speed, to introduce a time delay between the initiation of the go-around maneuver and the placing of the craft in a climb attitude. Further, because of the usual proximity of the craft to the landing field at the time control from the glide path signal is severed, it is preferable during the delay interval to level the aircraft off on a constant altitude flight path.

According to my invention, therefore, I have modified the arrangement of the aforesaid Patent No. 2,654,086 so that upon the manual initiation of the go-around maneuver, the glide path signal input to the indicator is again severed, but instead of immediately biasing the pitch signal input, I immediately substitute an altitude signal input of relatively high sensitivity for the severed glide path signal, which remains effective until the air speed of the craft reaches a safe value for climb, at which time the altitude signal is removed and the pitch signal is simultaneously biased to call for the requisite climb or fly-up attitude.

Besides providing means for delaying the biasing of the pitch signal input to the indicator until such time as the air speed reaches a safe value for climb, I further provide means operative to automatically reduce the steepness of the climb ultimately called for in the event that full engine power becomes unobtainable for any reason.

An actual measurement of air speed is taken in one form of my invention as determinative of the arrival of a safe air speed for climb. In another form of my invention, this determination is made on the basis of a predetermined time delay running from the initiation of the go-around maneuver.

While thus far my invention has been described in relation to a manual control system wherein the pilot relies for control guidance on a zero-reading indicator responsive to glide path displacement and pitch signals, the system may be readily converted into an automatic pilot arrangement by substituting a suitable elevator-actuating servomechanism for the zero-reading indicator, as will hereinafter be more fully described.

Referring to the drawings,

Fig. 1 is a schematic view of my improved arrangement, wherein an actual measure of air speed is taken; and Fig. 2 is a showing of a timing apparatus that may be substituted for the air speed measuring means of Fig. 1.

My improvement over the Pine et al., patent relates to a modification of just those control circuits that actuate the horizontal pointer of the cross-pointer indicator described herein. Accordingly, I have shown in Fig. 1 a zero-center meter-like indicator 1 minus a vertical pointer and the circuitry therefor, but having a horizontal pointer 2, the driving coil 3 of which is energized by the output of a mixer amplifier and rectifier 4.

As explained in the aforesaid patent, the output of a radio glide path receiver 5 after passing through a modulator 6 is led to the mixer amplifier and rectifier 4 where this signal is algebraically combined with a stabilizing pitch signal from a gyroscopic vertical 7. The pitch signal is represented as generated by a synchro 8 on the pitch axis of the gyroscope, and is proportional in amount to the departure of the craft from a level or trim position and has a phase that reverses according to whether such departure is up or down. The combined signal output, as amplified and rectified, is led to the zero reading indicator 1 thereby causing movement of horizontal pointer 2 up or down from its zero or central position depending on the vertical control the aircraft needs to keep it on the glide path.

It is characteristic of this type of system that an altitude displacement signal may be substituted for the glide path displacement signal in the event that the flight path desired to be flown is one of constant altitude instead of a radio-defined glide path. Accordingly, I have provided an altitude reference device 9 preferably of the type that provides an A. C. phase-reversing signal in accordance with the departure of the craft from the altitude at which a signal generator in the device is coupled to an altitude sensitive element. The coupling means is represented as an electromagnetic clutch 10 which may, for example, be arranged, together with device 9, as shown in U. S. Patent No. 2,446,546 for "Pressure Responsive Controller Device," issued August 10, 1948, to A. W. Meston.

In order to switch the system from one that supplies control information to maintain the craft on the radio glide path to one supplying control information to maintain the craft on a constant altitude flight path, I have provided a two-position flight path selector knob 11 which is mechanically connected to simultaneously position both a single-pole switch 12 and a double-throw switch 13 to their respective I. L. S. positions and ALT positions.

When in their ALT positions, switch 12 is opened to disconnect the glide path signal from an input lead 14 to mixer 4, while switch 13 is closed to energize clutch 10 through a battery 15 and connect to lead 14 a portion of the altitude signal of device 9 as obtained from the dividing point of a voltage divider 16 connected across the output of device 9. The resistance ratio of divider 16 is selected to provide a given altitude signal input per unit of departure from the reference altitude, this sensitivity being one which is satisfactory for cruising purposes.

On the other hand, when in their I. L. S. positions, switch 13 is opened to deenergize clutch 10 and disconnect the altitude signal from mixer input lead 14, while switch 12 is closed to connect the glide path signal to lead 14. Hence, by turning the flight path selector knob 11 to one position or the other, the pilot may select his flight path to be that of the radio glide path for landing purposes or one of constant altitude for cruising purposes.

According to my invention, as embodied in Fig. 1, the pilot may initiate a go-around maneuver while on glide path by manually operating a switching apparatus which functions both to sever the glide path signal to mixer 4 and simultaneously to operate clutch 10 and substitute for the glide path signal the full undivided output of altitude device 9. At the same time, also, an air speed responsive device is enabled or rendered capable of substituting a preselected fly-up biasing signal for the undivided altitude signal once the air speed has attained a predetermined safe climb-out value, it being assumed that the usual practice of manually advancing throttle with the initiation of the go-around is followed by the pilot.

The go-around switching apparatus comprises three switches 17–19, the movable elements of which are ganged together for simultaneous operation by a go-around actuator button 20. In their upper or normal positions, as depicted in Fig. 1, switch 17 connects the glide path signal via flight path selector switch 12 to mixer input lead 14, while switches 18 and 19 are each on dead contacts. When a go-around maneuver is to be initiated, the pilot operates button 20 to move switches 17–19 to their lower or go-around positions.

In its go-around position, switch 18 connects battery 15 so as to energize clutch 10 of altitude reference device 9. Switch 17, in its go-around position, disconnects the glide path signal from mixer 4 and substitutes therefor the full or undivided output from altitude device 9 as obtained across this device through a single-pole double-throw switch 21 controlled by a relay 22 and normally in the upper position shown in Fig. 1. Thus, an altitude signal of greater sensitivity than that employed for cruising purposes is substituted for the glide path signal upon the initiation of the go-around, whereby comparatively tight altitude control is supplied at the go-around altitude as the craft accelerates towards its climb-out air speed in response to manually increased throttle.

Switch 19, in its go-around position connects a battery 23 in series with the winding of relay 22 and another switch 24 which closes when the air speed of the craft reaches a preselected value that is safe for climb-out. In this regard, switch 24 is illustrated as having a wiper arm 25 arranged to be rotatably driven by the movable end of a Sylphon bellows 26 in response to air speed induced dynamic pressure introduced internally of the bellows by a Pitot tube 27. Bellows 26 and switch 24 are mounted in a container 28, the interior of which is kept at static pressure by means of a static tube 29. Wiper arm 25 is electrically connected to one of the leads 30 of the relay winding, and cooperates with an arcuate member having an insulator segment 31 and a conductor segment 32, the latter segment being electrically connected through switch 19 and battery 23 to the other lead 33 of the relay winding.

For all air speeds less than the preselected climb-out value, wiper arm 25 is on insulator segment 31, whereby switch 24 is open and relay 22 consequently is unenergized. But when the air speed reaches the preselected value during the go-around maneuver, wiper arm 25 is moved to conductor segment 32, whereby switch 24 is closed and relay 22 is energized to operate switch 21 to its lower position. In this position, switch 21 disconnects the undivided altitude signal from the input of mixer 4 and substitutes a fly-up signal obtained across a resistor 34 in the output of a signal generator 35 similar to gyroscope pick-off 7. The rotor of signal generator 35 may be angularly adjusted with respect to the stator by a knob 36 for varying the amount of fly-up signal supplied to mixer 4 by this device.

Thus adjusted, the fly-up signal is equivalent in value to the altitude signal produced by device 9 for a given downward altitude displacement, and is such as to call for a safe angle of climb at the preselected air speed. A reduction in engine power while the go-around maneuver is in progress, however, renders the angle of climb set in by knob 36 less safe, even although the power yet available is sufficient to maintain the preselected air speed. In order, therefore, to continue to provide the same measure of safety, I have provided means for monitoring engine power which functions to reduce the fly-up signal by one or more increments in the event that engine power is reduced below a given level.

The power monitoring means may comprise any suitable apparatus for providing a signal indicative of a loss of engine power. Such apparatus is well-known, and may, for example, be an engine torque meter in piston-engine or turbo prop aircraft and a gas pressure-responsive switch device in a jet-propelled aircraft. For illustrative purposes in Fig. 1, it is assumed that the aircraft employing my improved go-around arrangement is provided with two engines 37, 38 having power monitors 39, 40, respectively. The output of monitor 39 is connected to the winding of a relay 41 having a switch element 42 for adding a resistor 43 in series with resistor 34 when relay 41 is energized. Likewise, the output of monitor 40 is connected to the winding of a similar relay 44 having a switch element 45 for adding a resistor 46 in series with resistor 34 when relay 44 is energized. By this arrangement, a reduction of power in either engine is sensed by its monitor which in turn responds to energize its relay thereby to decrease or attenuate the fly-up signal across resistor 34 by a given increment.

As previously set forth, I may modify the arrangement of Fig. 1 by employing a timing device to approximate the function of the air speed apparatus within container 28. Accordingly, in Fig. 2 I have illustrated such a device and the connections it has to the switch 19 and relay 22 when employed in Fig. 1 in lieu of the air speed apparatus. Referring to Fig. 2, therefore, switch 19, in its lower or go-around position, now connects a battery 47 across a heating element 48 forming part of a thermal time delay unit having a bi-metallic switch element 49. Switch 49 is connected in series with battery 23 and the winding of relay 22 so that the energization of relay 22 is delayed a given amount of time subsequent to the actuation of go-around button 20. This time delay is selected, in view of the known performance of the aircraft, so as to be approximately equal to the time required by the aircraft to reach a safe climb-out speed from the moment the go-around is initiated and the throttles are advanced.

In order to convert the manual elevator control systems thus far described into automatic pilot arrangements by which the elevator is automatically positioned in response to flight path displacement and pitch attitude signals, I may also feed the signal output of mixer 4 (Fig. 1) via a lead 50 to an electrically-actuated servomechanism 51 having an electromagnetic clutch 52 in the output or driving connection to the elevator. By closing a switch 53 in the current supply to clutch 52, the latter engages the elevator to the output of servomechanism 51. In this event, the craft is automatically controlled to zero the output of mixer 4, and this operation may be checked by the pilot through reference to bar 2 of indicator 1. On opening switch 53, the elevator is restored to manual control, and the pilot operates a control column or other manual control device 54 to maneuver the craft to maintain bar 2 centered.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system by which an aircraft may be controlled alternatively to descend along a radio-defined glide path and to maintain a given altitude, radio receiver means for providing a first signal dependent on the vertical displacement of said craft from a radio-defined glide path, altitude reference means for providing a second signal dependent on changes in the altitude of said craft, signal-responsive controller means, first switching means for simultaneously connecting one of said signals to the input of said controller means and disconnecting the other of said signals therefrom, second switching means actuable for increasing the magnitude of said second signal for a given altitude change of said craft and for simultaneously connecting the modified second signal to the input of said controller means and preventing said first signal from reaching said input, means rendered operable by actuation of said second switching means for substituting a third signal for said modified second signal, said third signal being equivalent to the value of said first signal for a given displacement of said craft below said glide path, and means for operating said last-mentioned means when a predetermined condition for ascent of said aircraft is satisfied.

2. In a system by which an aircraft may be controlled alternatively to descend along a radio-defined glide path and to maintain a given altitude, radio receiver means for providing a first signal dependent on the vertical displacement of said craft from a radio-defined glide path, altitude reference means operable for providing a second signal dependent upon departures of said craft from the altitude at which said reference means is operated, signal responsive controller means, first switching means having one position for connecting said first signal to the input of said controller means and another position for operating said reference means and substituting said second signal output thereof for said first signal in said controller input, second switching means actuable for operating said reference means while increasing the signal to displacement ratio of said second signal output thereof and simultaneously connecting the modified second signal to the input of said controller means while preventing said first signal from reaching said input, means rendered operable by actuation of said second switching means for substituting a third signal for said modified second signal, said third signal being equivalent to the value of said second signal for a given downward altitude displacement of said craft, and means for operating said last-mentioned means when a predetermined condition for ascent of said aircraft is satisfied.

3. In a radio approach system for an aircraft, radio receiving means for providing a first signal dependent upon movement of said craft vertically of a radio-defined glide path, attitude responsive means for providing a second signal dependent upon departure of said craft from a given pitch attitude, utilization means responsive to said first and second signals for controlling said craft to descend along said glide path, altitude responsive means operable to provide a third signal dependent upon departure of said craft from the altitude at which said altitude responsive means is operated, manually controlled means actuable to operate said altitude control means and to simultaneously substitute said third signal output thereof for said first signal in control of said utilization means whereby said craft is controlled to maintain said altitude, means rendered operable by actuation of said manually controlled means for substituting a fourth signal for said third signal, said fourth signal being such as to call for ascent of said craft at a predetermined angle of climb, and means for operating said last-mentioned means when a predetermined condition for safe ascent of said aircraft at said angle of climb is satisfied.

4. In a radio approach system for controlling an aircraft in accordance with combined glide path displacement and pitch attitude signals to cause said craft to descend on a radio-defined glide path at a given pitch attitude, altitude responsive means operable to provide a signal dependent upon the displacement of said craft from the altitude at which said altitude means is operated, manual control means actuable for jointly operating said altitude means and combining the altitude displacement signal output thereof with said pitch attitude signal in substitution for said glide path displacement signal so that said craft is controlled to maintain the altitude of operation of said altitude means, means coupled to said manual control means and rendered operable by the actuation of the latter for combining a fixed signal with said pitch attitude signal in substitution for said altitude displacement signal, said fixed signal being equivalent to the altitude signal produced by a given displacement of said craft below said altitude of operation, whereby on operation of said fixed signal means said craft is controlled to assume a given climb attitude, and means for operating said fixed signal means upon the satisfaction of a condition predetermined to represent the arrival of said craft at a safe air speed for ascent at said climb attitude.

5. In a radio approach system for an aircraft, radio receiving means for providing a first signal dependent upon movement of said craft vertically of a radio-defined glide path, attitude-responsive means for providing a second signal dependent on departure of said craft from a given pitch attitude, utilization means responsive to said first and second signals for controlling said craft to descend along said glide path, altitude-responsive means operable to provide a third signal dependent upon departure of said craft from the altitude at which said altitude-responsive means is operated, manually-controlled means actuable to operate said altitude control means and to simultaneously substitute said third signal output thereof for said first signal in control of said utilization means whereby said craft is controlled to maintain said altitude, and airspeed-responsive means enabled by actuation of said manually-controlled means for substituting a fourth signal for said third signal for airspeeds in excess of a preselected value, said fourth signal being such as to call for ascent of said craft at a predetermined angle of climb.

6. The system of claim 5 wherein the aircraft is engine powered, said system further including power monitoring means for decreasing the fourth signal a selected amount when the engine power of said craft falls below a given magnitude.

7. In a radio approach system for an aircraft, radio receiving means for providing a first signal dependent upon movement of said craft vertically of a radio-defined glide path, attitude-responsive means for providing a second signal dependent on departure of said craft from a given pitch attitude, utilization means responsive to said first and second signals for controlling said craft to descend along said glide path, altitude-responsive means operable to provide a third signal dependent upon departure of said craft from the altitude at which said altitude-responsive means is operated, manually-controlled means actuable to simultaneously operate said altitude control means and to substitute said third signal output thereof for said first signal in control of said utilization means whereby said craft is controlled to maintain said altitude, and a timing device rendered operative by actuation of said manually-controlled means for substituting a fourth signal for said third signal at a time spaced a given interval from the time of its operation, said fourth signal being such as to call for ascent of said craft at a predetermined angle of climb.

No references cited.